(12) United States Patent
Uenishi

(10) Patent No.: US 11,829,530 B2
(45) Date of Patent: Nov. 28, 2023

(54) ELECTRONIC DEVICE, CONTROL METHOD OF ELECTRONIC DEVICE, AND NON-TRANSITORY COMPUTER READABLE MEDIUM

(71) Applicant: CANON KABUSHIKI KAISHA, Tokyo (JP)

(72) Inventor: Masaaki Uenishi, Kanagawa (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/163,364

(22) Filed: Feb. 2, 2023

(65) Prior Publication Data

US 2023/0251709 A1 Aug. 10, 2023

(30) Foreign Application Priority Data

Feb. 8, 2022 (JP) .................................. 2022-018221

(51) Int. Cl.
*G06F 3/01* (2006.01)
*G06T 7/70* (2017.01)
*G02B 27/01* (2006.01)
*G06T 7/20* (2017.01)

(52) U.S. Cl.
CPC ......... *G06F 3/013* (2013.01); *G02B 27/0101* (2013.01); *G06F 3/012* (2013.01); *G06T 7/20* (2013.01); *G06T 7/70* (2017.01); *G02B 2027/0187* (2013.01); *G06T 2200/24* (2013.01); *G06T 2207/30201* (2013.01)

(58) Field of Classification Search
CPC . G06F 3/013; G06F 3/012; G06T 7/70; G06T 7/20; G06T 2200/24; G06T 2207/30201; G02B 27/0101; G02B 2027/0187
See application file for complete search history.

(56) References Cited

U.S. PATENT DOCUMENTS

| | | | |
|---|---|---|---|
| 2019/0282894 A1* | 9/2019 | Zarganis | A63F 13/213 |
| 2019/0286232 A1* | 9/2019 | De Nardi | G06F 3/017 |
| 2019/0286303 A1* | 9/2019 | Hewitt | G06F 3/167 |
| 2019/0286403 A1* | 9/2019 | Cash | G06F 3/147 |

FOREIGN PATENT DOCUMENTS

| | | |
|---|---|---|
| JP | 2018-530798 A | 10/2018 |
| WO | 2017/038248 A1 | 3/2017 |

* cited by examiner

*Primary Examiner* — Sejoon Ahn
(74) *Attorney, Agent, or Firm* — Cowan, Liebowitz & Latman, P.C.

(57) ABSTRACT

An electronic device performs control to display a GUI on a display surface of a display device that is able to be attached to and detached from a head of a user; detects a gaze position of the user based on an image acquired by capturing an eye of the user; detects a pupil position of the user from the image of the eye; detects a motion of the head or a neck of the user; determines whether or not the user has an intention of operating a GUI in vicinity of the gaze position, based on the detected gaze position, the detected motion, and a change in the pupil position during the motion; and executes processing corresponding to the GUI in the vicinity of the gaze position in a case where it is determined that the user has the intention of operating the GUI.

16 Claims, 13 Drawing Sheets

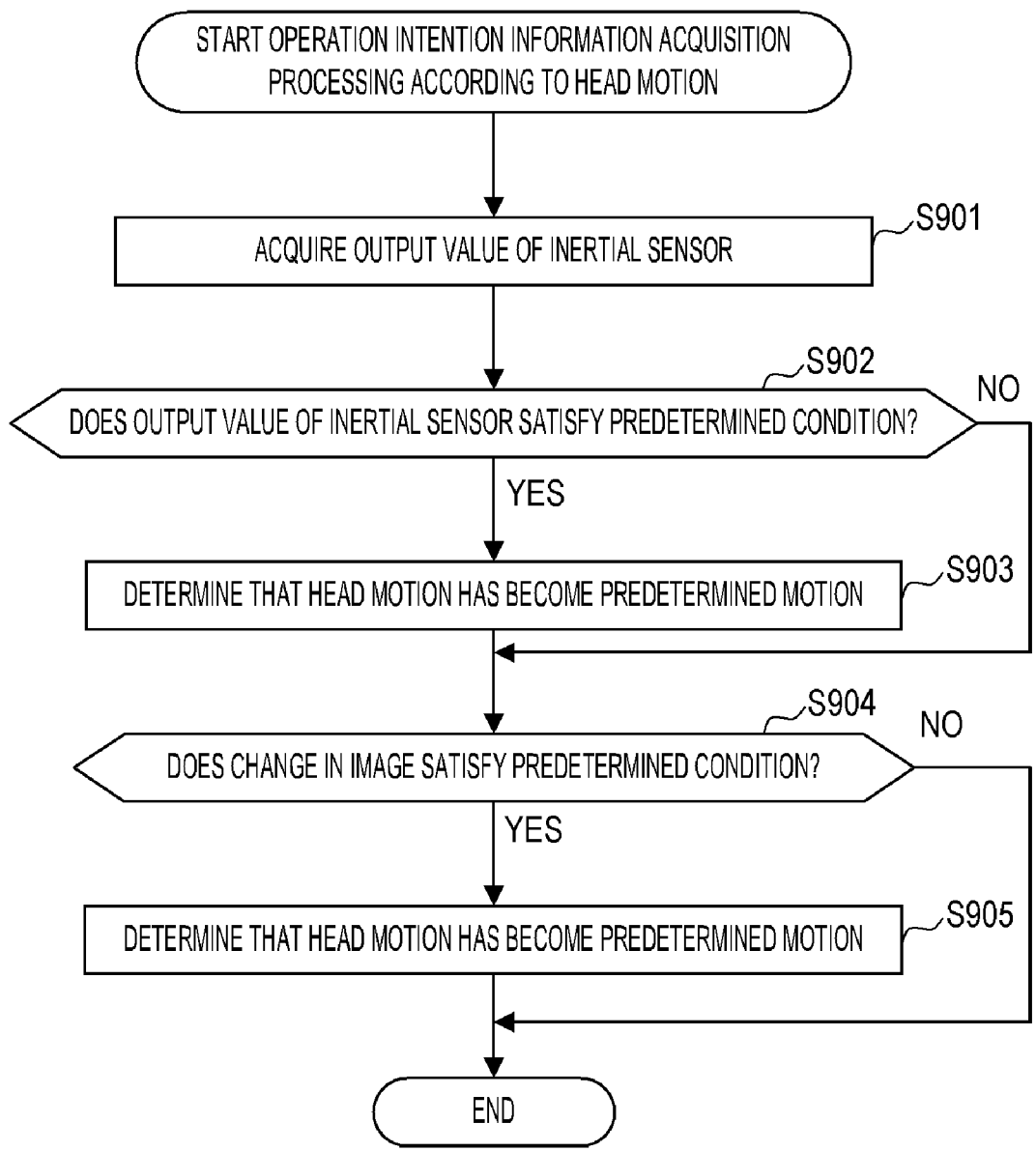

ELECTRONIC DEVICE, CONTROL METHOD OF ELECTRONIC DEVICE, AND NON-TRANSITORY COMPUTER READABLE MEDIUM

BACKGROUND OF THE INVENTION

Field of the Invention

The present invention relates to an electronic device, a control method of the electronic device, and a non-transitory computer readable medium.

Description of the Related Art

In recent years, head-mounted displays (HMDs) having a function of detecting a user's line of sight, such as spectacles-type devices using mixed reality (MR) and augmented reality (AR), have been automated and made intelligent. Regarding such HMDs, a method making it possible to easily operate an operation icon disposed on a display surface handsfree or the like has been proposed. For example, in a technique disclosed in Japanese Translation of PCT Application No. 2018-530798, in a case where a gaze point is detected within a predetermined threshold distance from an operation icon superimposed on a background and displayed on a display surface, processing corresponding to the operation icon is performed. In the technique disclosed in WO 2017/038248, an operation corresponding to an operation icon (element) gazed at by a user is confirmed based on the user's line of sight and the movement of the user's head.

However, in the technique disclosed in Japanese Translation of PCT Application No. 2018-530798, an erroneous operation is performed in a case where a user accidentally gazes at an operation icon even when the user does not intend to operate the operation icon. Further, in the technique disclosed in WO 2017/038248, it is easy to perform a desired operation based on the user's line of sight and the movement of the user's head, but in a case where a plurality of operation icons are disposed at positions close to each other, it may not be possible to determine which operation icon a user desired to operate and an erroneous operation may be performed.

SUMMARY OF THE INVENTION

The present invention provides a technique to enable a simple and accurate GUI operation.

The present invention in its first aspect provides an electronic device including at least one memory and at least one processor which function as: a control unit configured to perform control to display a GUI on a display surface of a display device that is able to be attached to and detached from a head of a user; a gaze detection unit configured to detect a gaze position of the user based on an image acquired by capturing an eye of the user; a pupil detection unit configured to detect a pupil position of the user from the image of the eye; a motion detection unit configured to detect a motion of the head or a neck of the user; a determination unit configured to determine whether or not the user has an intention of operating a GUI in vicinity of the gaze position, based on the gaze position detected by the gaze detection unit, the motion detected by the motion detection unit, and a change in the pupil position during the motion; and an execution unit configured to execute processing corresponding to the GUI in the vicinity of the gaze position in a case where the determination unit determines that the user has the intention of operating the GUI.

The present invention in its second aspect provides an electronic device including at least one memory and at least one processor which function as: a control unit configured to perform control to display a GUI on a display surface of a display device that is able to be attached to and detached from a head of a user; a gaze detection unit configured to detect a gaze position of the user based on an image acquired by capturing an eye of the user; a motion detection unit configured to detect a motion of the head or a neck of the user; a determination unit configured to determine whether or not the user has an intention of operating a GUI in vicinity of the gaze position, based on the gaze position detected by the gaze detection unit, the motion detected by the motion detection unit, and a change in the gaze position during the motion; and an execution unit configured to execute processing corresponding to the GUI in the vicinity of the gaze position in a case where the determination unit determines that the user has the intention of operating the GUI.

The present invention in its third aspect provides an electronic device including at least one memory and at least one processor which function as: a control unit configured to perform control to display a GUI on a display surface of a display device that is able to be attached to and detached from a head of a user; and a selection unit configured to select the GUI displayed by the control unit, wherein a GUI to be selected in a case where the user moves the head without moving eyes is different from a GUI to be selected in a case where the user moves the head and moves the eyes to cancel out the movement of the head.

The present invention in its fourth aspect provides a control method of an electronic device, including: performing control to display a GUI on a display surface of a display device that is able to be attached to and detached from a head of a user; detecting a gaze position of the user based on an image acquired by capturing an eye of the user; detecting a pupil position of the user from the image of the eye; detecting a motion of the head or a neck of the user; determining whether or not the user has an intention of operating a GUI in vicinity of the gaze position, based on the detected gaze position, the detected motion, and a change in the pupil position during the motion; and executing processing corresponding to the GUI in the vicinity of the gaze position in a case where it is determined that the user has the intention of operating the GUI.

The present invention in its fifth aspect provides a control method of an electronic device, including: performing control to display a GUI on a display surface of a display device that is able to be attached to and detached from a head of a user; detecting a gaze position of the user based on an image acquired by capturing an eye of the user; detecting a motion of the head or a neck of the user; determining whether or not the user has an intention of operating a GUI in vicinity of the gaze position, based on the detected gaze position, the detected motion, and a change in the gaze position during the motion; and executing processing corresponding to the GUI in the vicinity of the gaze position in a case where it is determined that the user has the intention of operating the GUI.

The present invention in its sixth aspect provides a non-transitory computer readable medium that stores a program, wherein the program causes a computer to execute a control method of an electronic device, the control method including: performing control to display a GUI on a display surface of a display device that is able to be attached to and detached from a head of a user; detecting a gaze position of the user based on an image acquired by capturing an eye of the user; detecting a pupil position of the user from the image of the eye; detecting a motion of the head or a neck of the user; determining whether or not the user has an intention of operating a GUI in vicinity of the gaze position, based on the detected gaze position, the detected motion, and a change in the pupil position during the motion; and executing processing corresponding to the GUI in the vicinity of the gaze position in a case where it is determined that the user has the intention of operating the GUI.

The present invention in its seventh aspect provides a non-transitory computer readable medium that stores a program, wherein the program causes a computer to execute a control method of an electronic device, the control method including: performing control to display a GUI on a display surface of a display device that is able to be attached to and detached from a head of a user; detecting a gaze position of the user based on an image acquired by capturing an eye of the user; detecting a motion of the head or a neck of the user; determining whether or not the user has an intention of operating a GUI in vicinity of the gaze position, based on the detected gaze position, the detected motion, and a change in the gaze position during the motion; and executing processing corresponding to the GUI in the vicinity of the gaze position in a case where it is determined that the user has the intention of operating the GUI.

Further features of the present invention will become apparent from the following description of exemplary embodiments with reference to the attached drawings.

BRIEF DESCRIPTION OF THE DRAWINGS

FIG. 9 is a flowchart of the operation intention information acquisition processing according to a head motion.

DESCRIPTION OF THE EMBODIMENTS

An embodiment of the present invention will be described below with reference to the accompanying drawings. However, the present invention is not limited to the following embodiment.

Configuration

Figure 1:
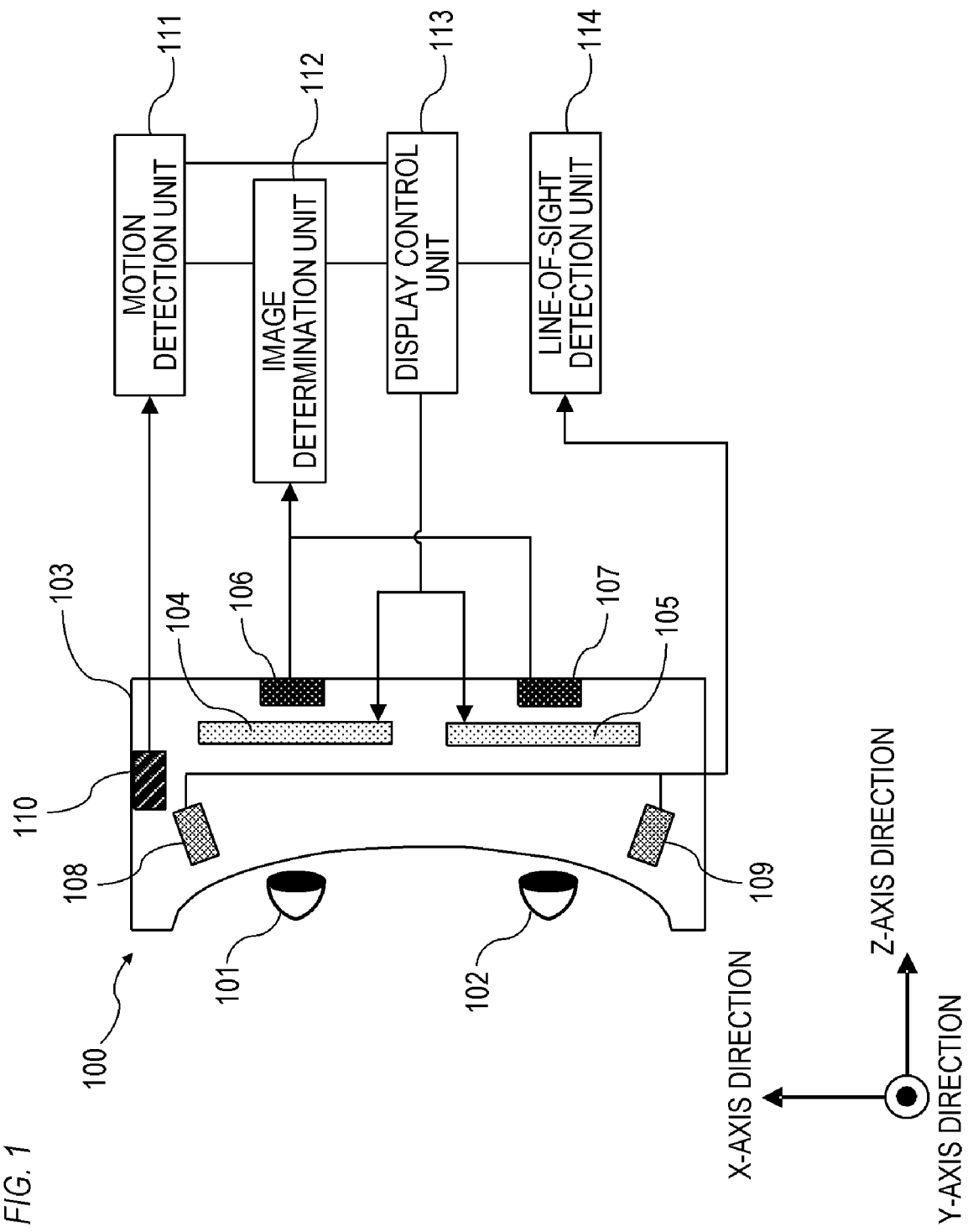
FIG. 1 is a schematic configuration diagram of an HMD.

FIG. 1 illustrates a schematic configuration diagram of a head-mounted display (HMD) 100 according to the present embodiment. In FIG. 1, a configuration diagram on the left illustrates a configuration of the HMD 100 from the top of the head of a user, and a block diagram on the right illustrates a functional configuration of the HMD 100. The HMD 100 is a display device that is able to be attached to and detached from the user's head.

When a housing 103 of the HMD 100 is worn on the head, a left eye 101 and a right eye 102 can observe the real space through a transmissive left-eye display 104 and a transmissive right-eye display 105, respectively. By displaying a video such as an operation icon on the left-eye display 104 and the right-eye display 105, the HMD 100 can superimpose the displayed video on the real world viewed by the user through the left-eye display 104 and the right-eye display 105. That is, the HMD 100 is an optical see-through display (optical see-through HMD).

In addition, the present invention can also be applied to another configuration. For example, a non-transmissive display is used, and an eyepiece is disposed between an eye and the non-transmissive display. In a non-transmissive mode, the non-transmissive display displays internally stored videos (captured moving images, game videos, and the like). In a transmissive mode, the non-transmissive display displays an image captured by the left-eye camera 106 or the right-eye camera 107 so that the real space can be seen through. The non-transmissive display may display a video in which an internal video and a captured image are combined. The present invention can also be applied to such a configuration. That is, the present invention can also be applied to an HMD that displays a video of a virtual space unrelated to the real space, a video see-through display (video see-through HMD), an HMD that can selectively execute these operations, and the like.

A left-eye line-of-sight detector 108 is used to estimate a region gazed at by the user on the left-eye display 104. Similarly, a right-eye line-of-sight detector 109 is used to estimate a region gazed at by the user on the right-eye display 105.

Figure 10A:
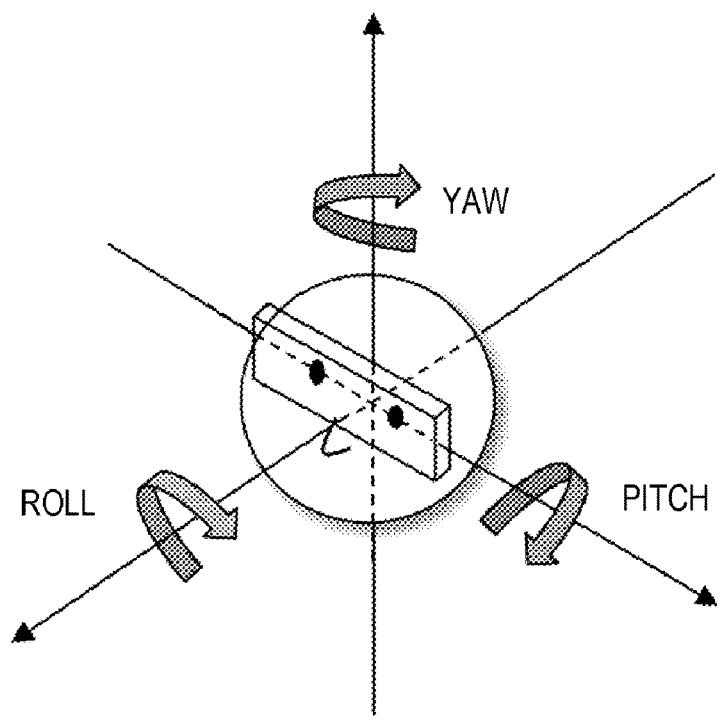
FIGS. 10A to 10C are diagrams illustrating output values of an inertial sensor.
Figure 10B:
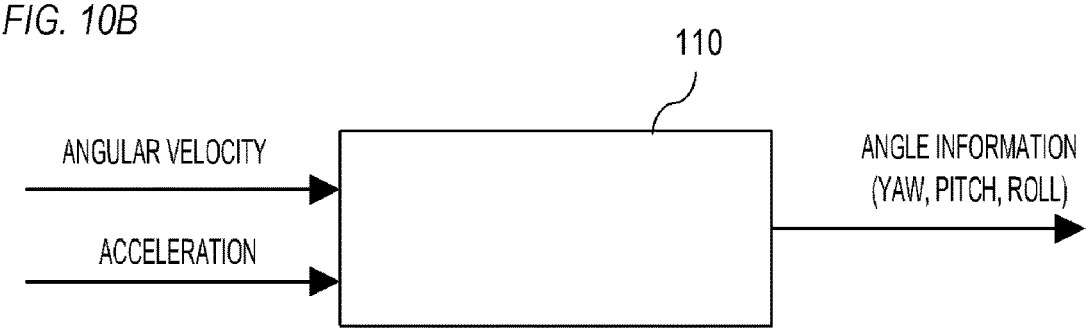

An inertial sensor 110 is constituted by two sensors, that is, an acceleration sensor that detects translational motions on XYZ axes, and a gyro sensor that detects rotational motions around YPR (yaw, pitch, roll) axes as illustrated in FIG. 10A. The inertial sensor 110 can comprehensively detect translational motions and rotational motions by associating these two sensors (inertial sensor fusion). Specifically, as illustrated in FIG. 10B, the inertial sensor 110 receives inputs of an angular velocity and an acceleration, and outputs angle information (angle/angular velocity) in each of the yaw, pitch, and roll directions. Although the inertial sensor is applied to the HMD 100 in the present embodiment, a configuration in which only a gyro sensor is applied to the HMD 100 may be adopted.

A motion detection unit 111 detects the head motion or neck of the user wearing the HMD 100 on the head (hereinafter referred to as a "head motion"). The motion detection unit 111 detects a head motion based on an output value (output result) of the inertial sensor 110 or an output value of an image determination unit 112. Note that the motion detection unit 111 may detect a head motion based on an output value of the gyro sensor.

The image determination unit 112 determines changes in images captured by the left-eye camera 106 or the right-eye camera 107. For example, the image determination unit 112 calculates a motion vector in an image captured by the left-eye camera 106 or the right-eye camera 107 by calculating a difference image in a time direction for the image.

A display control unit 113 performs control so that a graphical user interface (GUI) including an operation icon is displayed on the left-eye display 104 and the right-eye display 105. The display control unit 113 can also perform control so that an image captured by the left-eye camera 106 is displayed on the left-eye display 104, and perform control so that an image captured by the right-eye camera 107 is displayed on the right-eye display 105.

The user can visually recognize (see) a range corresponding to the orientation of the head in a three-dimensional space (real space or virtual space) together with a GUI displayed on a display surface (display surfaces of the left-eye display 104 and the right-eye display 105) of the HMD 100. The GUI is a first GUI of which the position on the display surface is fixed, or a second GUI which is disposed in a three-dimensional space and of which the position on the display surface changes depending on changes in the orientation of the head.

A line-of-sight detection unit 114 detects the line-of-sight position (gaze position) of the user on the display surface. For example, the line-of-sight detection unit 114 estimates a region gazed at by the user on the left-eye display 104 or estimates a region gazed at by the user on the right-eye display 105. Details of a line-of-sight detection method will be described later.

In addition, the HMD 100 also has a function of communicating with an external device and acquiring information on an object. Note that the HMD 100 may be provided with a global positioning system (GPS) module that acquires its own positional information by radio waves from artificial satellites.

Figure 2:
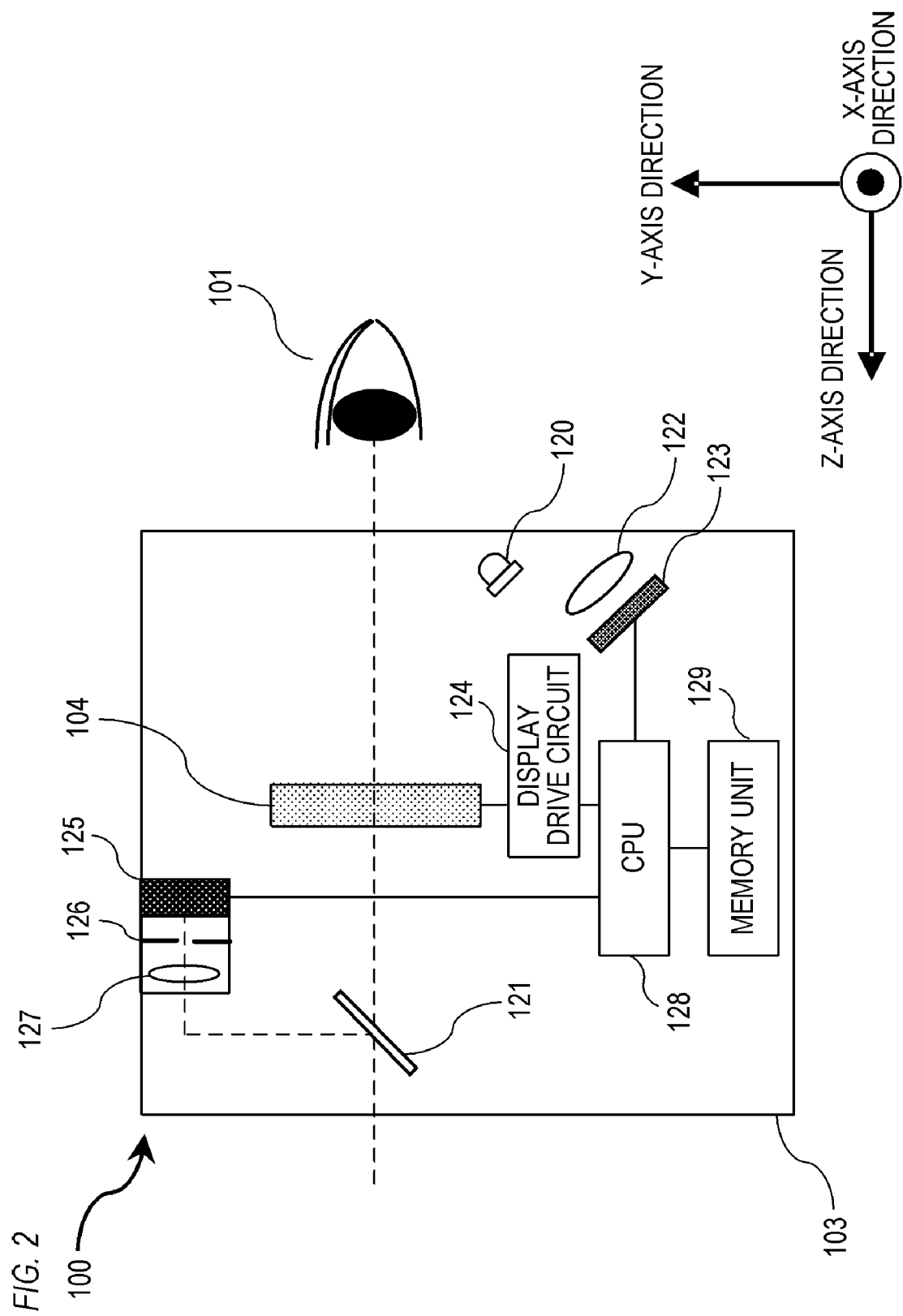
FIG. 2 is a cross-sectional view of the HMD.

FIG. 2 is a cross-sectional view of the HMD 100 which is cut along a YZ plane formed by the Y-axis and Z-axis illustrated in FIG. 1, and illustrates a schematic view of a mechanism for performing line-of-sight detection (gaze detection). Note that FIG. 2 is a cross-sectional view viewed from the left eye side of the user, but the same is true of the right eye side. In FIG. 2, the housing 103 is the housing of the HMD 100, and configurations of the units included therein are as follows.

The HMD 100 includes a CPU 128 that controls the entire HMD 100 and a memory unit 129 in which video information is recorded. In addition, the HMD 100 is also provided with the transmissive left-eye display 104 constituted by liquid crystal or the like for displaying videos, and a display drive circuit 124 for driving the left-eye display 104.

In addition, an imaging element 125, an aperture mechanism 126, and a focus mechanism 127 are disposed as mechanisms constituting the left-eye camera 106 that captures an image of the outside, and the left-eye camera 106 can capture an image of a field through a light splitter 121.

An illumination light source 120 is a light source that illuminates the left eye 101 for line-of-sight detection, and is constituted by, for example, a plurality of infrared light emitting diodes. An eyeball image of the illuminated left eye 101 and an image (corneal reflection image) formed by corneal reflection of the illumination light source 120 are formed on an eye imaging element 123 in which a row of photoelectric elements, such as CMOS, are two-dimensionally disposed by a light receiving lens 122.

The light receiving lens 122 positions the pupil of the user's left eye 101 and the eye imaging element 123 in a complementary imaging relationship. From the positional relationship between the eyeball image formed on the eye imaging element 123 and the image formed by the corneal reflection of the illumination light source 120, a line-of-sight direction is detected by a predetermined algorithm, which will be described later. Note that the illumination light source 120, the light receiving lens 122, and the eye imaging element 123 are mechanisms that constitute the left-eye line-of-sight detector 108.

The memory unit 129 is a storage medium (recording medium) having a function of storing imaging signals received from the imaging element 125 and the eye imaging element 123 and a function of storing line-of-sight correction parameters.

Line-of-Sight Detection Operation

Figure 3:
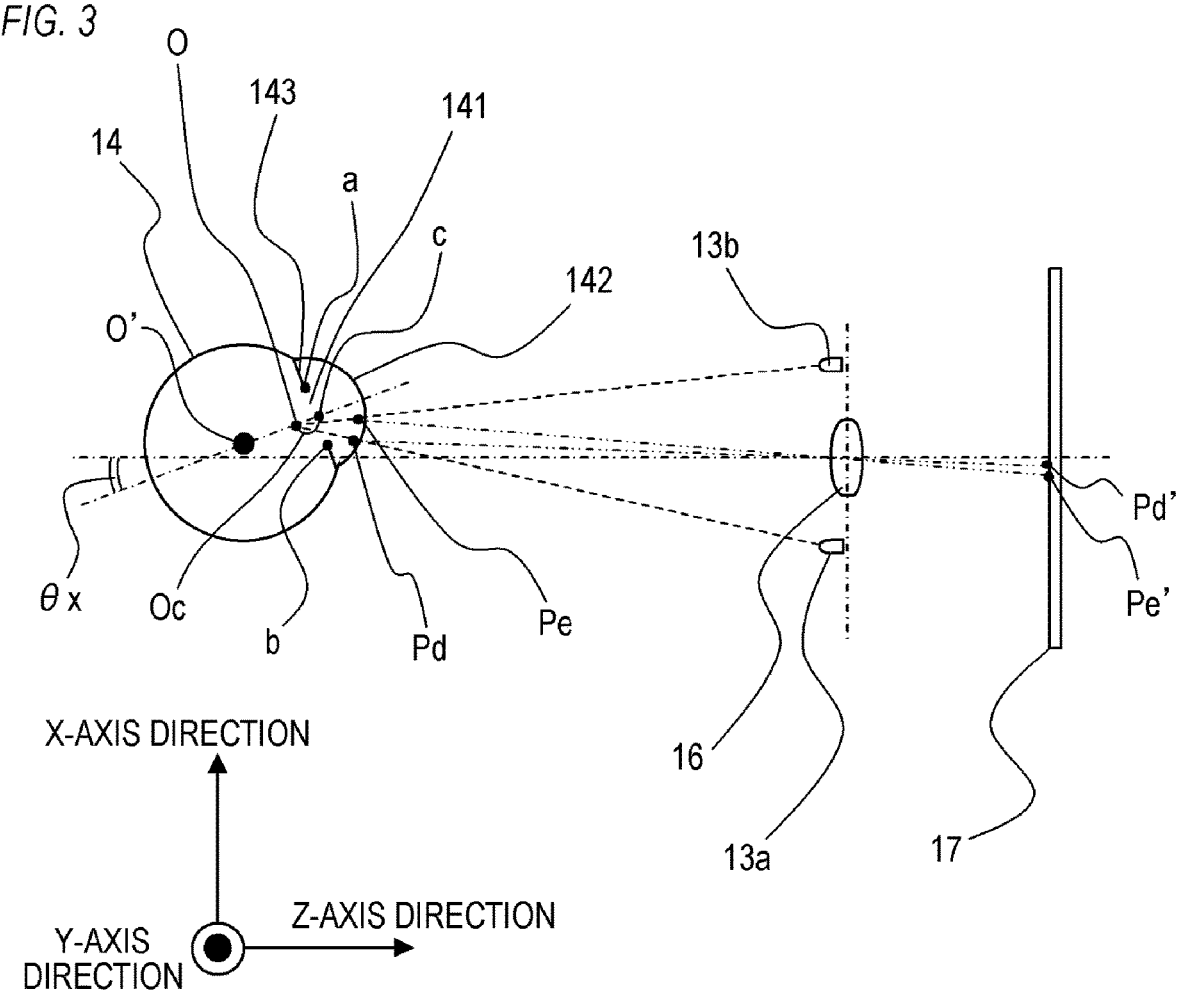
FIG. 3 is a diagram illustrating the principle of a visual field detection method.
Figure 4A:
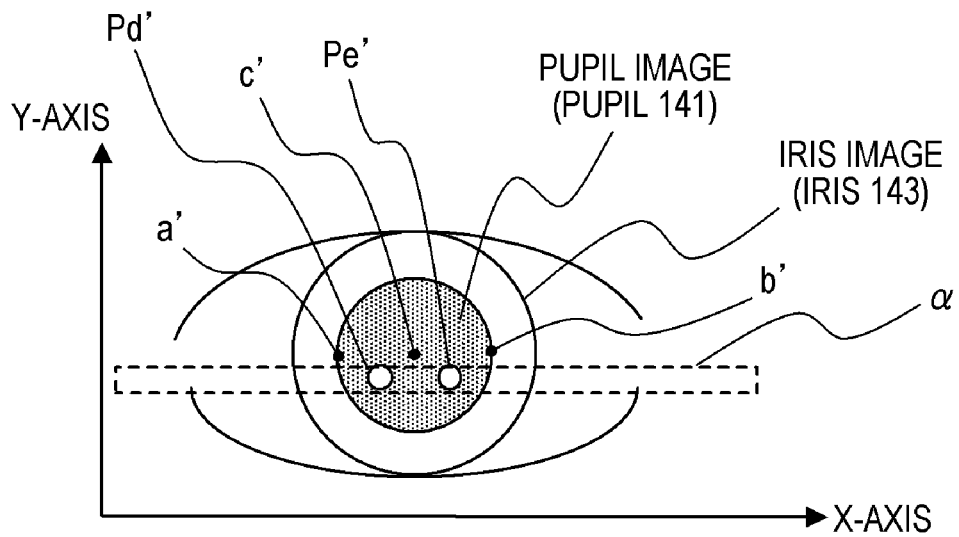
FIG. 4A is a diagram illustrating an eye image.
Figure 4B:
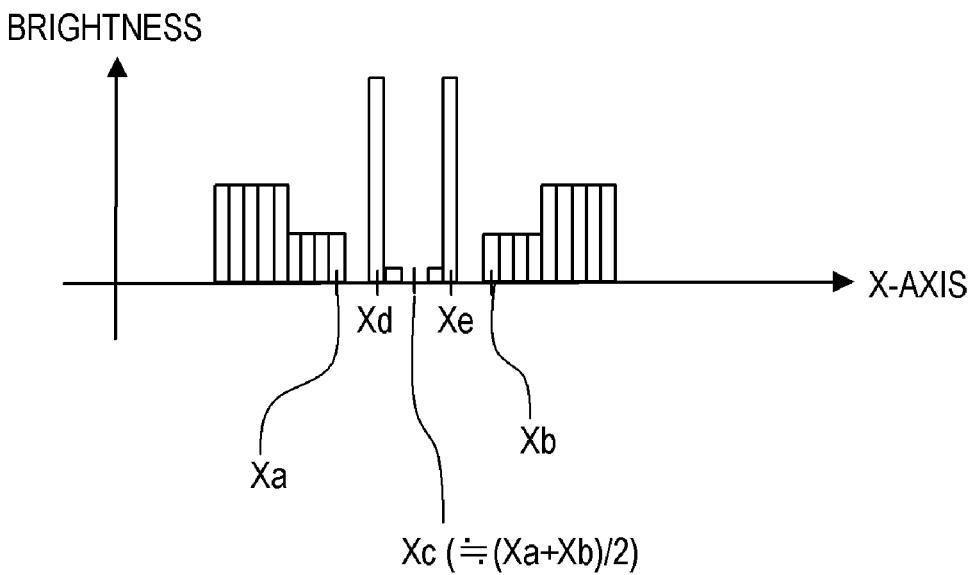
FIG. 4B is a diagram illustrating a brightness distribution of the eye image.
Figure 5:
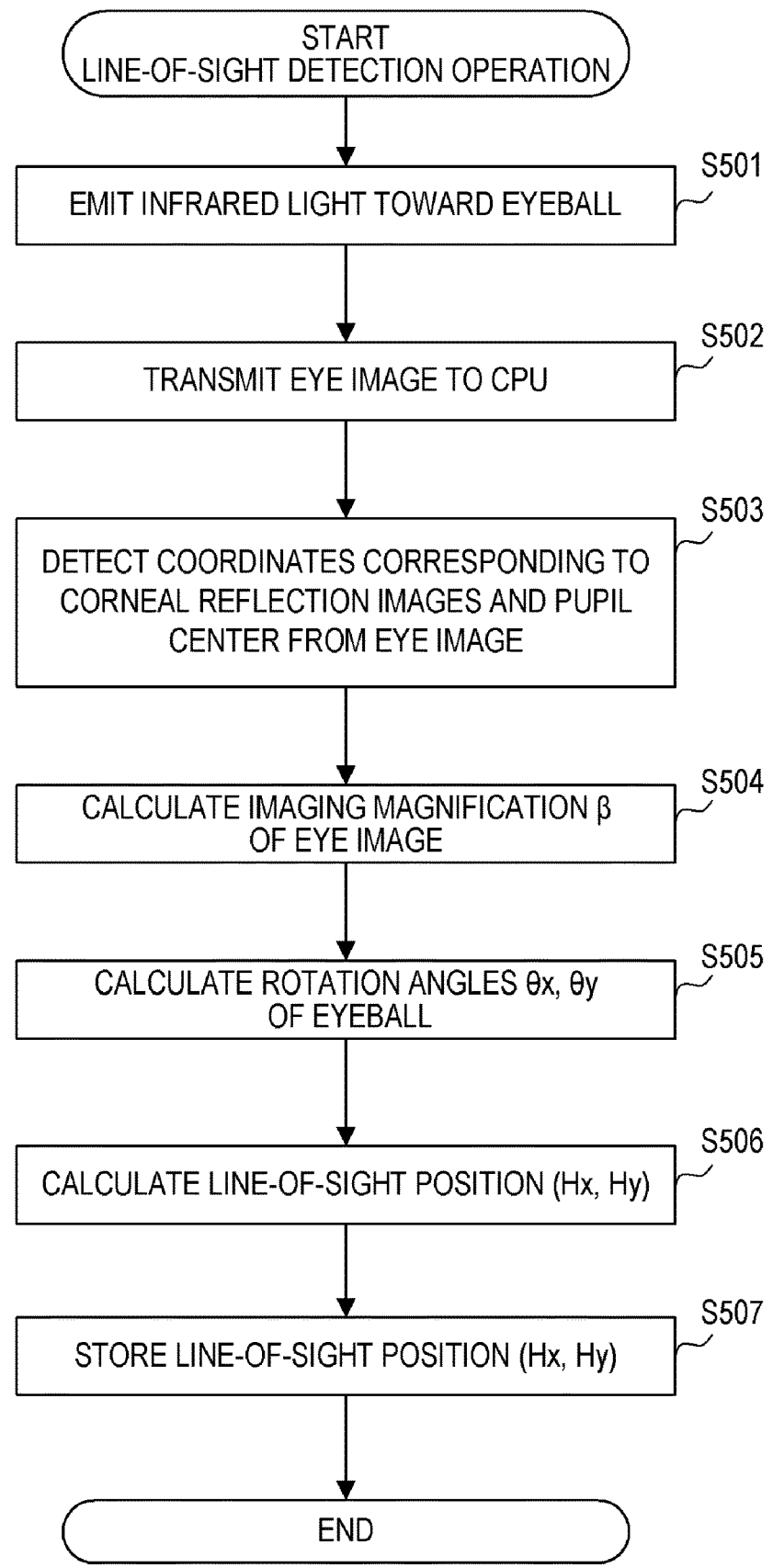
FIG. 5 is a flowchart of a line-of-sight detection operation.

A line-of-sight detection method will be described using FIGS. 3, 4A, 4B, and 5. FIG. 3 is a diagram illustrating the principle of a line-of-sight detection method, and is a schematic view of an optical system for performing line-of-sight detection. As illustrated in FIG. 3, light sources 13*a* and 13*b* are disposed substantially symmetrically with respect to the optical axis of the light receiving lens 16 and illuminate the eyeball 14 of the user. A portion of light emitted from the light sources 13*a* and 13*b* and reflected by the eyeball 14 is condensed onto the eye imaging element 17 by the light receiving lens 16. FIG. 4A is a schematic view of an eye image captured by the eye imaging element 17 (an eyeball image projected onto the eye imaging element 17), and FIG. 4B is a diagram illustrating the output intensity of the CCD in the eye imaging element 17. FIG. 5 illustrates a schematic flowchart of a line-of-sight detection operation.

When a line-of-sight detection operation is started, the light sources 13*a* and 13*b* emit infrared light toward the user's eyeball 14 in step S501 of FIG. 5. The user's eyeball image illuminated with the infrared light is formed on the eye imaging element 17 through the light receiving lens 16 and photoelectrically converted by the eye imaging element 17. Thereby, an electrical signal of an eye image that can be processed is obtained.

In step S502, the line-of-sight detection circuit 201 transmits the eye image (eye image signal; electric signal of eye image) which is obtained from the eye imaging element 17 to the CPU 3.

In step S503, the CPU 3 obtains the coordinates of points corresponding to corneal reflection images Pd and Pe of the light sources 13*a* and 13*b* and a pupil center c from the eye image obtained in step S502.

The infrared light emitted from the light sources 13*a* and 13*b* illuminates a cornea 142 of the eyeball 14 of the user. At this time, the corneal reflection images Pd and Pe formed by a portion of the infrared light reflected by the surface of the cornea 142 are condensed by the light receiving lens 16 and formed on the eye imaging element 17 to form corneal reflection images Pd' and Pe' in the eye image. Similarly, light beams from ends a and b of the pupil 141 are also imaged on the eye imaging element 17 to form pupil edge images a' and b' in the eye image.

FIG. 4B illustrates brightness information (brightness distribution) of a region a in the eye image in FIG. 4A. In FIG. 4B, a brightness distribution in an X-axis direction is illustrated when the horizontal direction of the eye image is the X-axis direction, and the vertical direction is a Y-axis direction. In the present embodiment, the coordinates of the corneal reflection images Pd' and Pe' in the X-axis direction (horizontal direction) are assumed to be Xd and Xe, and the coordinates of the pupil edge images a' and b' in the X-axis direction are assumed to be Xa and Xb. As illustrated in FIG. 4B, an extremely high level of brightness is obtained at the coordinates Xd and Xe of the corneal reflection images Pd' and Pe'. In a region ranging from the coordinate Xa to the coordinate Xb, which is equivalent to the region of the pupil 141 (the region of the pupil image obtained by imaging light beams from the pupil 141 on the eye imaging element 17), an extremely low level of brightness is obtained, except for the coordinates Xd and Xe. Then, in the region of an iris 143 outside the pupil 141 (the region of an iris image outside the pupil image which is obtained by imaging light beams from the iris 143), an intermediate brightness between the above-described two types of brightness is obtained. Specifically, the intermediate brightness between the above-described two types of brightness is obtained in a region where the X coordinate (coordinate in the X-axis direction) is smaller than the coordinate Xa and in a region where the X coordinate is larger than the coordinate Xb.

From the brightness distribution as illustrated in FIG. 4B, the X coordinates Xd and Xe of the corneal reflection images Pd' and Pe' and the X coordinates Xa and Xb of the pupil edge images a' and b' can be obtained. Specifically, coordinates with an extremely high brightness can be obtained as the coordinates of the corneal reflection images Pd' and Pe', and coordinates with an extremely low brightness can be obtained as the coordinates of the pupil edge images a' and b'. Further, in a case where a rotation angle θx of the optical axis of the eyeball 14 with respect to the optical axis of the light receiving lens 16 is small, a coordinate Xc of a pupil center image c' (the center of the pupil image) which is obtained by imaging a light beam from the pupil center c on the eye imaging element 17 can be represented as Xc≈(Xa+Xb)/2. That is, the coordinate Xc of the pupil center image c' can be calculated from the X coordinates Xa and Xb of the pupil edge images a' and b'. In this manner, the coordinates of the corneal reflection images Pd' and Pe' and the coordinates of the pupil center image c' can be estimated.

In step S504, the CPU 3 calculates an imaging magnification β of the eyeball image. The imaging magnification β is a magnification determined by the position of the eyeball 14 with respect to the light receiving lens 16, and can be obtained using a function of an interval (Xd-Xe) between the corneal reflection images Pd' and Pe'.

In step S505, the CPU 3 calculates a rotation angle of the optical axis of the eyeball 14 with respect to the optical axis of the light receiving lens 16. The X coordinate of each of the central points of the corneal reflection image Pd and the corneal reflection image Pe and the X coordinate of the center of curvature O of the cornea 142 are substantially consistent with each other. For this reason, when a standard distance from the center of curvature O of the cornea 142 to the center c of the pupil 141 is assumed to be Oc, a rotation angle θx of the eyeball 14 in the ZX plane (a plane perpendicular to the Y axis) can be calculated by the following Formula 1. A rotation angle θy of the eyeball 14 within the ZY plane (a plane perpendicular to the X axis) can also be calculated by the same method as the method of calculating the rotation angle θx.

$$\beta \times Oc \times \mathrm{SIN}\ \theta x \approx \{(Xd+Xe)/2\} - Xc \quad \text{(Formula 1)}$$

In step S506, the CPU 3 obtains (estimates) the user's viewpoint on the display surface of the HMD 100 (a position where the line of sight is focused; the position viewed by the user) using the rotation angles θx and θy calculated in step S505. Assuming that a line-of-sight position (coordinates of the viewpoint) (Hx, Hy) is coordinates corresponding to the pupil center c, the line-of-sight position (Hx, Hy) can be calculated by the following Formulas 2 and 3.

$$Hx = m \times (Ax \times \theta x + Bx) \quad \text{(Formula 2)}$$

$$Hy = m \times (Ay \times \theta y + By) \quad \text{(Formula 3)}$$

A parameter m in Formulas 2 and 3 is a constant determined by a configuration of a viewfinder optical system (light receiving lens 16 or the like) of the camera 1, and is a conversion factor for converting the rotation angles θx and θy into coordinates corresponding to the pupil center c on the display surface (screen) of the HMD 100. It is assumed that the parameter m is determined in advance and stored in the memory unit 129. Parameters Ax, Bx, Ay, and By are line-of-sight correction parameters for correcting individual differences in line of sight and are acquired by performing calibration work. It is assumed that the parameters Ax, Bx, Ay, and By are stored in the memory unit 129 before a line-of-sight detection operation is started.

In step S507, the CPU 3 stores the line-of-sight position (Hx, Hy) in the memory unit 129 and terminates the line-of-sight detection operation.

GUI Operation Method of HMD

A GUI operation method of the HMD 100 according to the present embodiment will be described below with reference to FIGS. 6A, 6B, 7, 8, 9, 10A, 10B, and 10C.

Figure 6A:
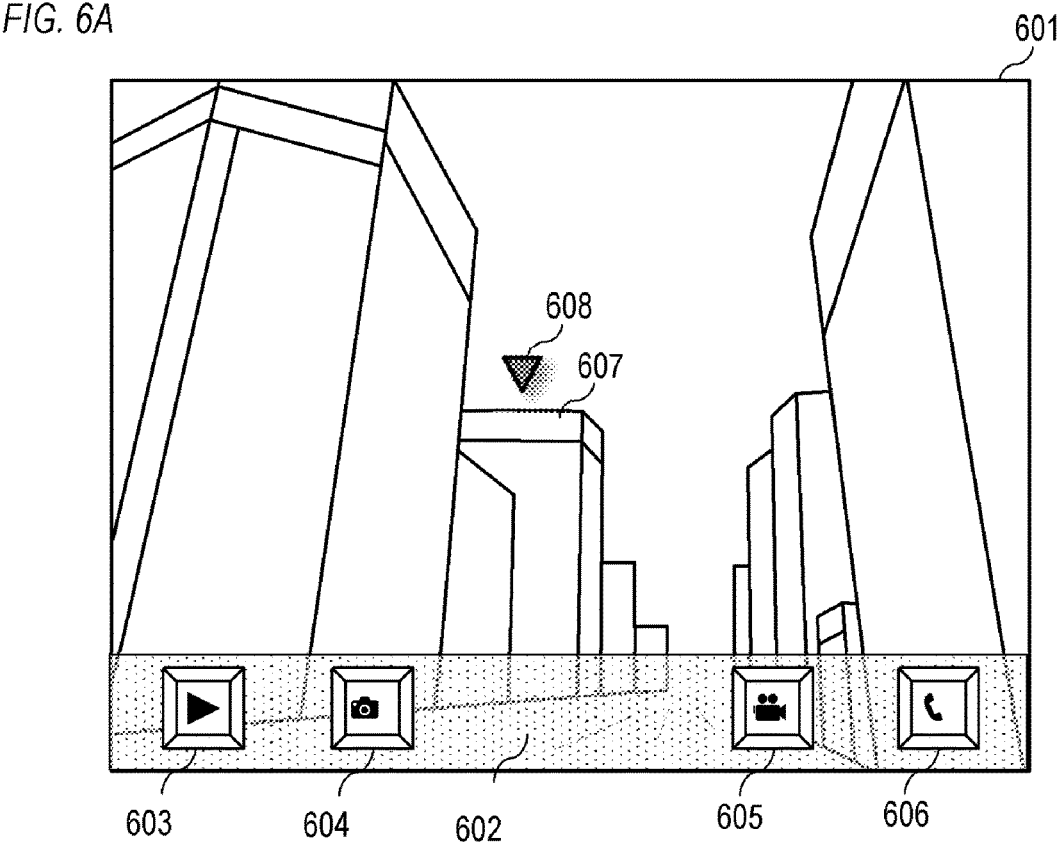
FIGS. 6A and 6B are diagrams illustrating a background viewed by a user through the HMD.

FIG. 6A is a diagram illustrating the background that the user sees through the HMD 100. The HMD 100 displays an operation icon display region 602 so as to be translucently superimposed on a background 601 and further displays various operation icons 603 to 606 so as to be superimposed in the operation icon display region 602. The operation icon display region 602 and the various operation icons 603 to 606 are fixed on the display surface. The operation icons 603 to 606 are examples of a first GUI of which the position on the display surface is fixed. In addition, the HMD 100 displays an operation icon 608 indicating that there is information on an object (building) 607 in the background 601 so as to be superimposed in the vicinity of the object 607. The operation icon 608 is associated with the object 607 and is fixed at the object position in the real space so that it remains positioned in the vicinity of the object 607 even when the range of the background viewed by the user changes. The operation icon 608 is an example of a second GUI which is disposed in a three-dimensional space and of which the position on the display surface changes depending on changes in the orientation of the head.

Figure 6B:
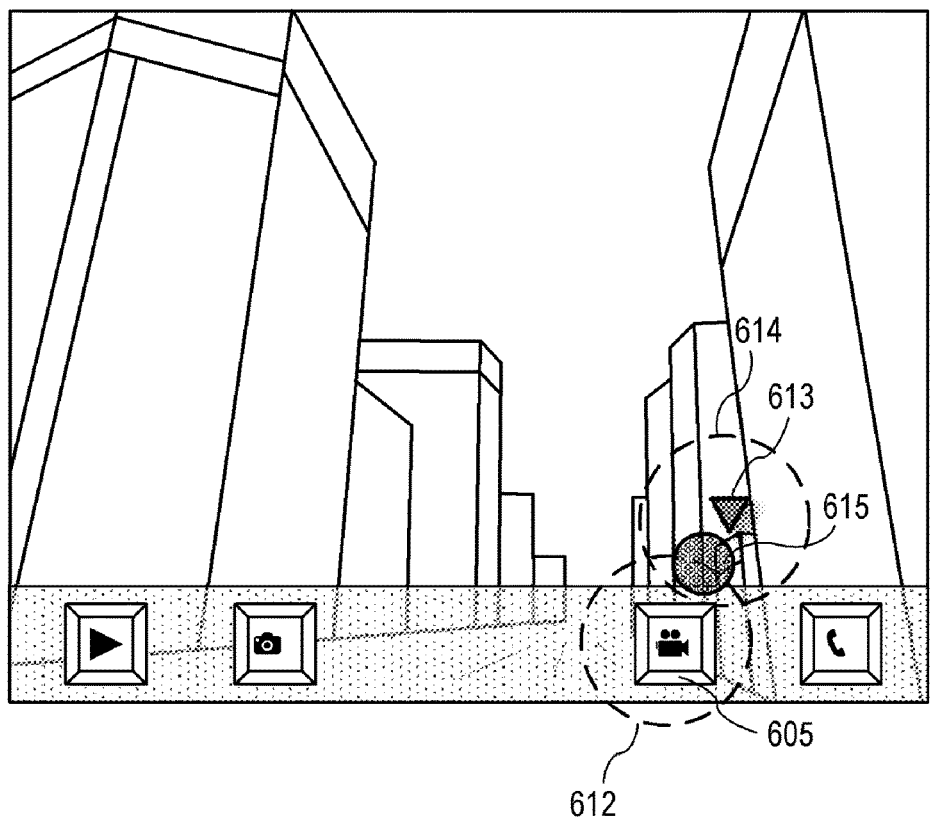

As illustrated in FIG. 6B, depending on the position of the object in the background, an operation icon 613 fixed at the object position in the real space may be displayed in the vicinity of an operation icon 605 fixed on the display surface. In this case, a line-of-sight position 615 of the user may be detected in a region where a region 612 and a region 614 overlap each other. In the region 612, it is determined that the operation icon 605 is gazed at, and in the region 614, it is determined that the operation icon 613 is gazed at. In such a situation, it is not possible to determine which one of the operation icon 605 and the operation icon 613 the user has an intention of operating only from the user's line-of-sight position and head motion. Consequently, in the present embodiment, the HMD 100 determines whether or not the user has an intention of operating the GUI in the vicinity of the line-of-sight position, based on the line-of-sight position of the user, the head motion, and changes in the pupil center position during the head motion.

HMD Operation

Figure 7:
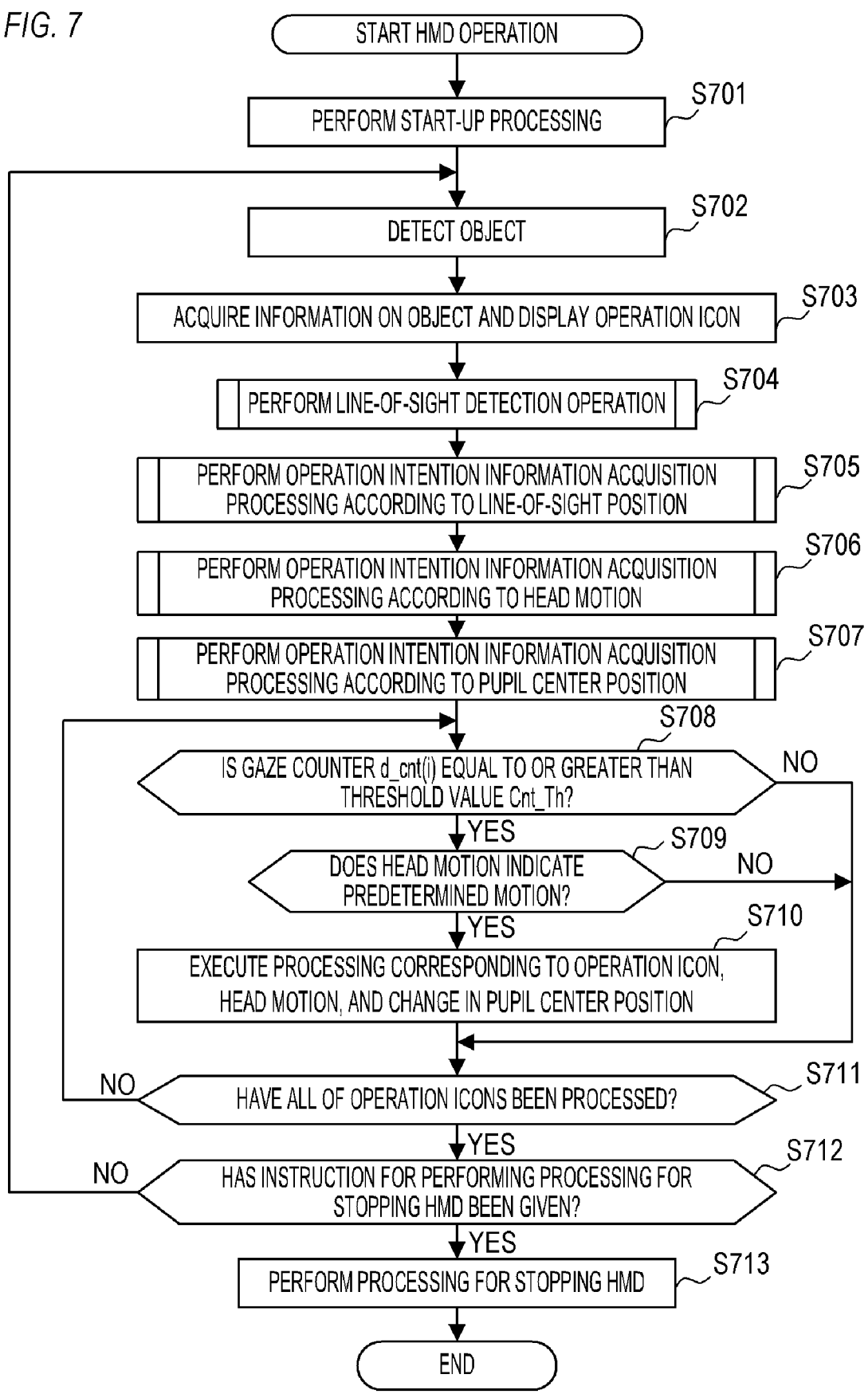
FIG. 7 is a flowchart of HMD operation.

FIG. 7 is a flowchart illustrating the operation of the HMD 100 according to the present embodiment.

First, in step S701, the CPU 128 performs start-up processing of the HMD 100. In step S702, the CPU 128 detects an object in a background (within an angle of view) viewed by the user through HMD 100 using images captured by left-eye camera 106 and the right-eye camera 107.

In step S703, the CPU 128 acquires information on an object based on an image of the object detected in step S702 and positional information obtained by a GPS. The CPU 128 displays an operation icon, which indicates that there is information on the object detected in step S702, in the vicinity of the object, like the operation icon 608 in FIG. 6A. The information on the object is acquired, for example, by causing the CPU 128 connected to a network such as the Internet to communicate with an external device such as a server.

In step S704, the CPU 128 performs the above-described line-of-sight detection operation to calculate the line-of-sight position of the user.

In step S705, the CPU 128 performs processing for acquiring operation intention information according to the line-of-sight position based on the line-of-sight position calculated by the line-of-sight detection operation in step S704. In step S706, the CPU 128 performs processing for acquiring operation intention information according to the head motion. In step S707, the CPU 128 performs processing for acquiring operation intention information according to the pupil center position by using the information of the pupil center position calculated by the line-of-sight detection operation in step S704. Details of the processing for acquiring the operation intention information according to the line-of-sight position, the head motion, and the pupil center position will be described later. Note that the operation intention information is information indicating that the user has an intention of operating an operation icon.

In steps S708 to S711, the CPU 128 sequentially performs a series of processing while focusing on all of the operation icons displayed on the display surface one by one. Hereinafter, the order of processing is indicated by i.

In step S708, the CPU 128 determines whether a gaze count value d_cnt(i) of an i-th operation icon, which is currently focused, is equal to or greater than a predetermined threshold value Cnt_Th, based on the result of the operation intention information acquisition processing according to the line-of-sight position (step S705). In a case where the gaze count value d_cnt(i) is equal to or greater than the predetermined threshold value Cnt_Th, the CPU 128 proceeds to step S709, and otherwise proceeds to step S711. Note that the gaze count value d_cnt(i) is equivalent to a gaze time. In order to ascertain that the gaze continues during a period in which a predetermined head motion is performed, the threshold value Cnt_Th may be set to be approximately the same time as the time required for the predetermined head motion. A method of calculating the gaze count value d_cnt(i) will be described later.

In step S709, the CPU 128 determines whether or not the head motion indicates a predetermined motion, based on the result of the operation intention information acquisition processing (step S706) according to the head motion. In a case where the head motion indicates the predetermined motion, the CPU 128 proceeds to step S710, and otherwise proceeds to step S711.

In step S710, the CPU 128 determines whether or not the user has an intention of operating an operation icon i (i-th operation icon) which is currently focused, based on the result of the operation intention information acquisition processing according to the pupil center position (step S707). Then, in a case where it is determined that the user has an intention of operating the operation icon i, processing corresponding to the operation icon is executed.

In step S711, the CPU 128 determines whether or not the processing of steps S708 to S710 has been performed on all of the operation icons displayed on the display surface. In a case where the processing has been performed on all of the operation icons displayed on the display surface, the CPU 128 proceeds to step S712, and otherwise returns to step S708 to perform the processing of steps S708 to S710 on operation icons on which the processing has not been performed.

In step S712, the CPU 128 determines whether or not an instruction for stopping the HMD 100 has been given. The CPU 128 proceeds to step S713 in a case where not an instruction for stopping the HMD 100 has been given, and otherwise returns to step S702.

In step S713, the CPU 128 performs processing for stopping the HMD 100. When the processing for stopping the HMD 100 is terminated, the CPU 128 terminates the present flow.

Figure 8:
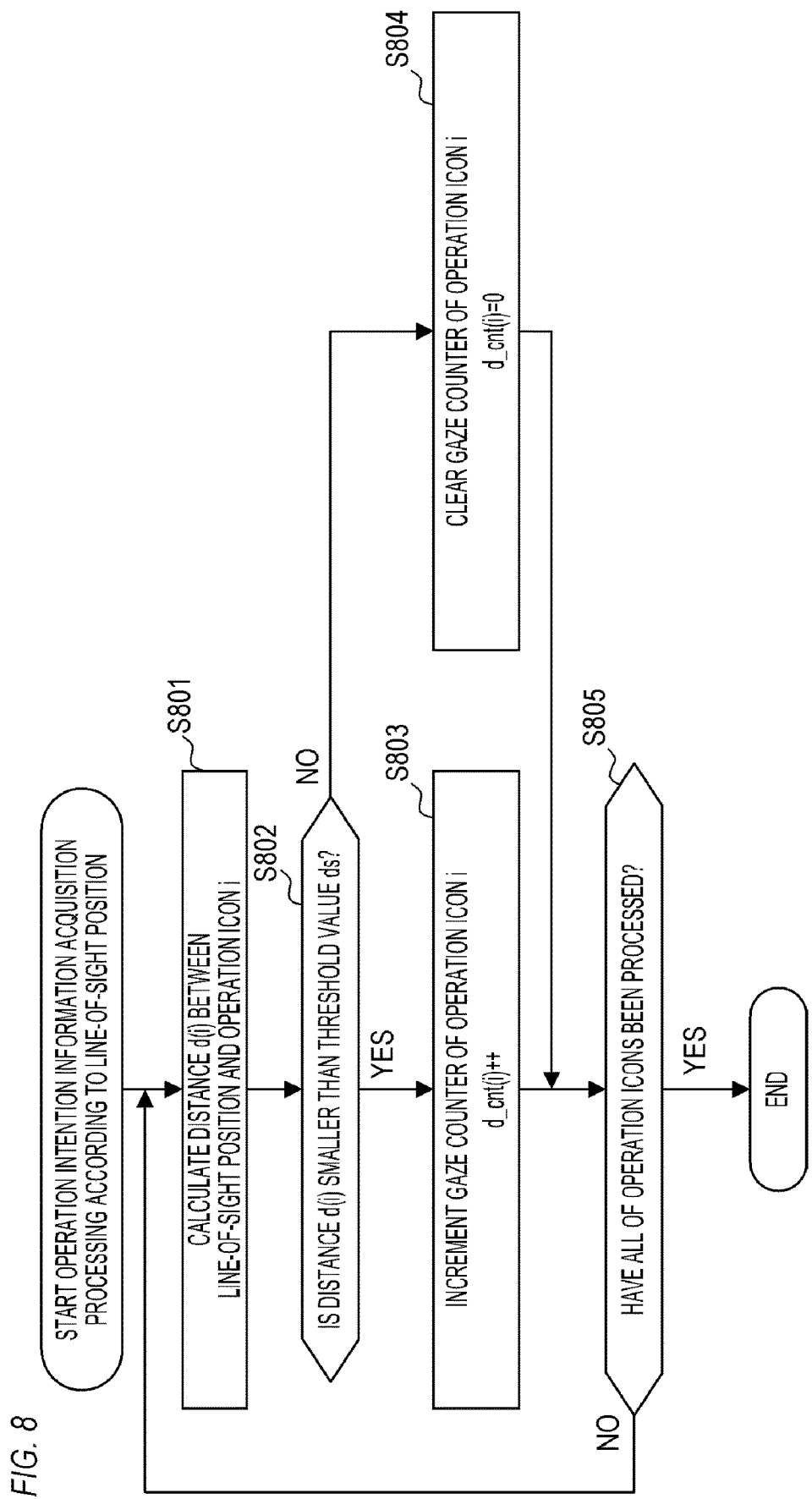
FIG. 8 is a flowchart of operation intention information acquisition processing according to a line-of-sight position.

Operation Intention Information Acquisition Processing According to Line-of-Sight Position FIG. 8 is a flowchart illustrating operation intention information acquisition processing according to a line-of-sight position in step S705 of the HMD operation flow in FIG. 7.

In steps S801 to S805, the CPU 128 sequentially performs a series of processing while focusing on all of the operation icons displayed on the display surface one by one. Hereinafter, the order of icons of which processing is to be executed is indicated by i.

First, in step S801, the CPU 128 calculates a distance d(i) on the display surface from a line-of-sight position to a currently focused operation icon i. The distance d(i) is, for example, the shortest distance from the line-of-sight position to the operation icon i. Note that the distance d(i) may be, for example, a distance from the line-of-sight position to the center position of the operation icon i.

In step S802, the CPU 128 determines whether or not the distance d(i) is smaller than a predetermined threshold value ds. In a case where the distance d(i) is smaller than the threshold value ds, the CPU 128 proceeds to step S803, and otherwise proceeds to step S804. Note that the CPU 128 may proceed to step S803 in a case where the distance d(i) is equal to the threshold value ds. Here, the threshold value ds may be set to specify a relatively small range (for example, a minimum range) that can include variations in line-of-sight position detected when a person is continuously gazing at a certain point. The variations in line-of-sight position occurs due to the accuracy of line-of-sight detection, a head motion, involuntary eye movement during fixation, and the like.

In step S803, the CPU 128 increments a gaze counter d_cnt(i) of the operation icon i by one.

In step S804, the CPU 128 clears (resets) the gaze counter d_cnt(i) of the operation icon i to 0.

In step S805, the CPU 128 determines whether or not the processing of steps S801 to S804 has been performed on all of the operation icons on the display surface. In a case where the processing has been performed on all of the operation icons on the display surface, the CPU 128 terminates the present flow, and otherwise returns to step S801 to perform the processing of steps S801 to S804 on operation icons on which the processing has not been performed.

Operation Intention Information Acquisition Processing According to Head Motion

FIG. 9 is a flowchart illustrating operation intention information acquisition processing according to a head motion in step S706 of the HMD operation flow in FIG. 7.

First, in step S901, the CPU 128 acquires an output value of the inertial sensor 110.

In step S902, the CPU 128 determines whether or not the output value of the inertial sensor 110 satisfies a predetermined condition using the motion detection unit 111. The predetermined condition is satisfied, for example, when the output value of the inertial sensor 110 is set to equal to or greater than a threshold value Th_p in a positive direction and then set to equal to or less than a threshold value Th_m in a negative direction during a predetermined period of time Int_t. The CPU 128 proceeds to step S903 in a case where the output value of the inertial sensor 110 satisfies the predetermined condition, and otherwise proceeds to step S904.

In step S903, the CPU 128 determines that the head motion has become a predetermined motion. The predetermined motion is, for example, a "nodding motion", a "motion of shaking the head right and left", and a "motion of tilting the head".

Here, an example of the processing of steps S901 to S903 will be described. As illustrated in FIG. 10B, inertial sensor 110 outputs angle information (angle/angular velocity) in each of three directions, that is, a yaw direction, a pitch direction, and a roll direction. In the present embodiment, for example, the CPU 128 detects the user's "nodding motion" (a short-time motion of turning back after looking down) using the output information on the angular velocity in the pitch direction.

Figure 10C:
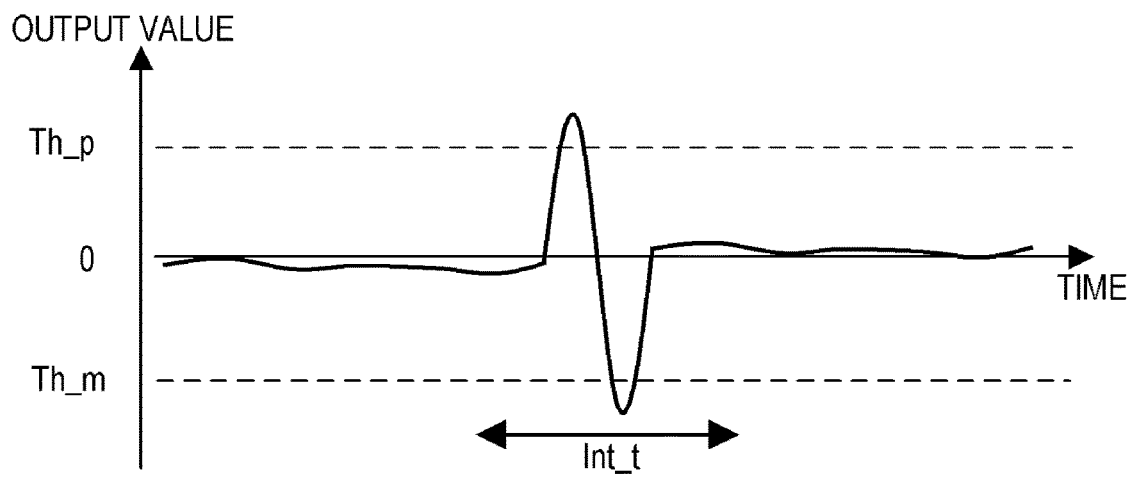

FIG. 10C is a diagram illustrating changes with time in an output value in the pitch direction which is output by the inertial sensor 110 when the user performs a "nodding motion". The output value of the inertial sensor 110 increases in a positive direction when the user rapidly looks down, and then increases in a negative direction when the user rapidly returns to the original orientation (facing forward). The CPU 128 can determine whether or not the user has performed a "nodding motion" by determining whether or not the output value of the inertial sensor 110 has been set to equal to or greater than a threshold value Th_p in the positive direction and then set to equal to or less than a threshold value Th_m in the negative direction during a predetermined period of time Int_t. Note that the CPU 128 can determine a "motion of shaking the head right and left" from the output value in the yaw direction and determine a "motion of tilting the head" from the output value in the roll direction in the same manner as the "nodding motion".

Description will return to FIG. 9. In step S904, the CPU 128 determines whether or not a change in an image captured by at least one of the left-eye camera 106 and the right-eye camera 107 satisfies a predetermined condition by using the image determination unit 112 and the motion detection unit 111. The predetermined condition is satisfied, for example, when the sum of motion vectors in the image suddenly turns upward and then suddenly turns downward within a predetermined period of time. In a case where the change in the image satisfies the predetermined condition, the CPU 128 proceeds to step S905, and otherwise terminates the present flow.

In step S905, the CPU 128 determines that the head motion has become a predetermined motion, and terminates the present flow.

Here, an example of the processing of steps S904 and S905 will be described. Imaging performed by the left-eye camera 106 or the right-eye camera 107 is performed periodically. With respect to a captured image, the image determination unit 112 can calculate a motion vector in the captured image by calculating a difference image in a time direction. The CPU 128 can estimate the user's head motion based on the motion vector calculated by the image determination unit 112. For example, the CPU 128 can determine that a "nodding motion" has been performed when the sum of motion vectors in the image suddenly turns upward and then suddenly turns downward within the predetermined period of time. The CPU 128 can also determine a "motion of shaking the head right and left" and a "motion of tilting the head" in the same manner as the "nodding motion".

Figure 11:
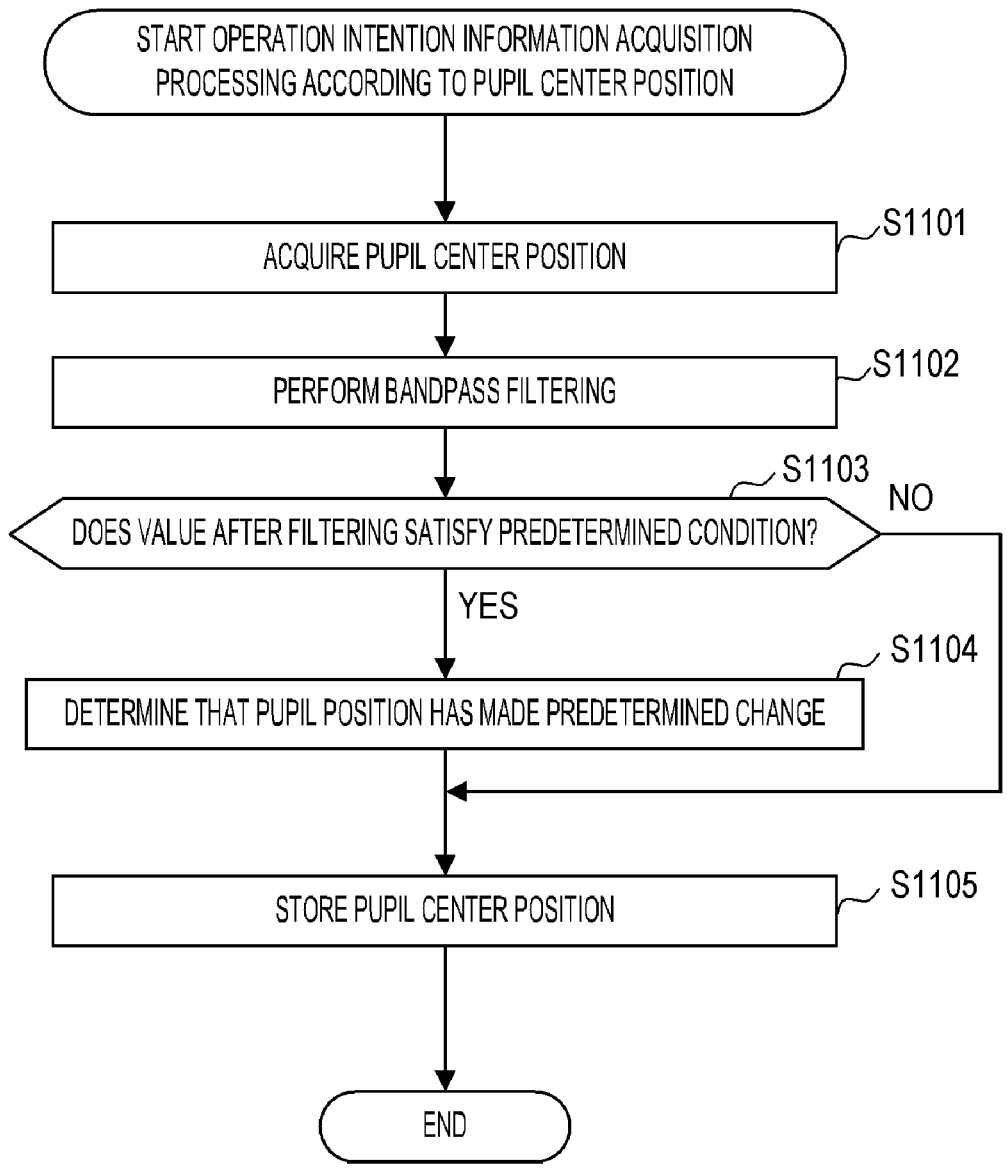
FIG. 11 is a flowchart of operation intention information acquisition processing at a pupil center position.

Operation Intention Information Acquisition Processing According to Pupil Center Position FIG. 11 is a flowchart illustrating operation intention information acquisition processing according to a pupil center position in step S707 of the HMD operation flow in FIG. 7.

Figure 12A:
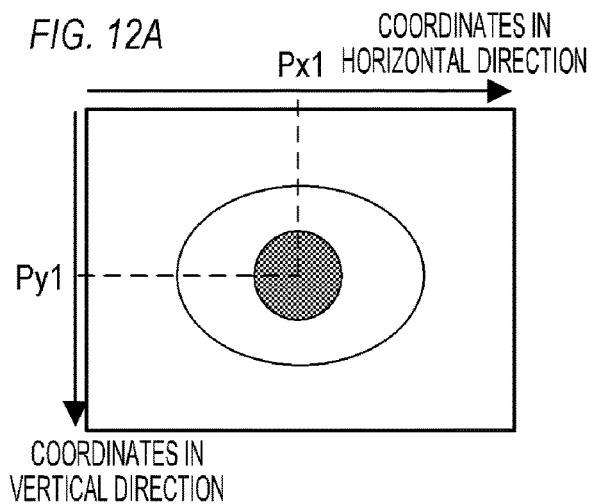
FIGS. 12A to 12D are diagrams illustrating changes in a pupil center position during a head motion.

First, in step S1101, the CPU 128 acquires a pupil center position from the result of pupil detection performed in the course of the line-of-sight detection operation. As the pupil center position, coordinates (Px1, Py1) in the horizontal and vertical directions are acquired, for example, as illustrated in FIG. 12A. Note that the line-of-sight position indicates the coordinates of a position on a display surface which is viewed by the user, and the pupil center position indicates the coordinates of the center position of the pupil in an image of the user's eye.

In step S1102, the CPU 128 performs bandpass filtering in a time direction in each of the horizontal and vertical directions by using the current pupil center position acquired in step S1101 and the pupil center position acquired in the past.

Figure 12B:
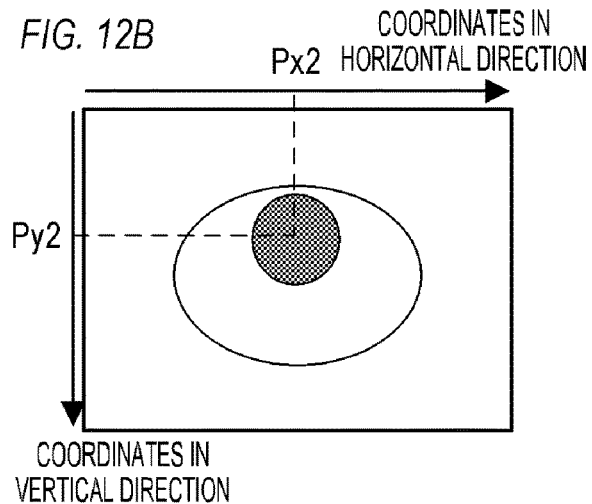
Figure 12C:
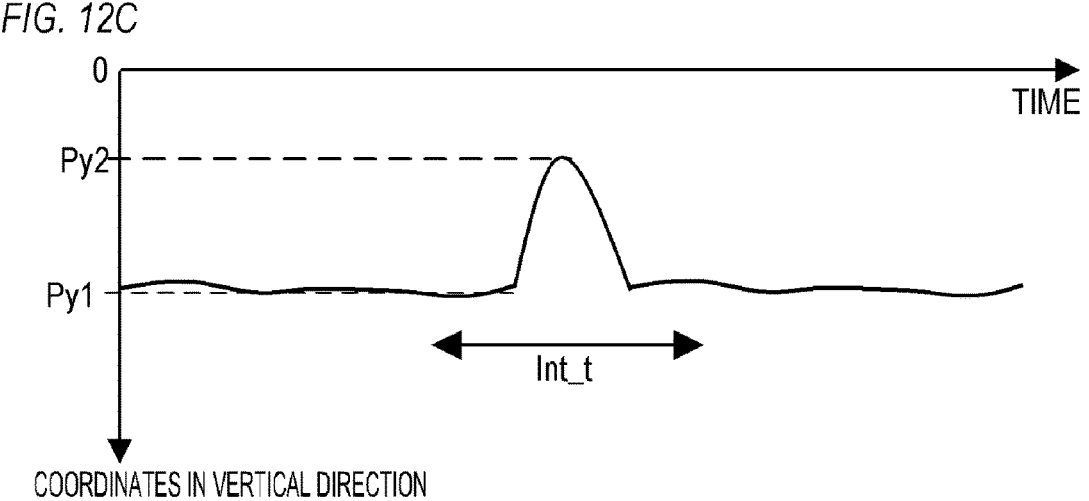

Here, the bandpass filtering in the vertical direction will be described as an example with reference to FIG. 6A and FIGS. 12A to 12D. FIGS. 12A to 12C are diagrams illustrating changes in pupil center position during a head motion. For example, when the user performs a "nodding motion" while gazing at the operation icon fixed in the vicinity of an object in the rear space like the operation icon 608 in FIG. 6A, the pupil center position in the image of the eye rapidly moves upward and then rapidly returns to the original position. Specifically, the pupil center position rapidly moves upward from (Px1, Py1) illustrated in FIG. 12A to (Px2, Py2) illustrated in FIG. 12B, and then rapidly returns to (Px1, Py1) which is the original position. FIG. 12C illustrates changes with time in coordinates of the pupil center position in the vertical direction during the "nodding motion".

Figure 12D:
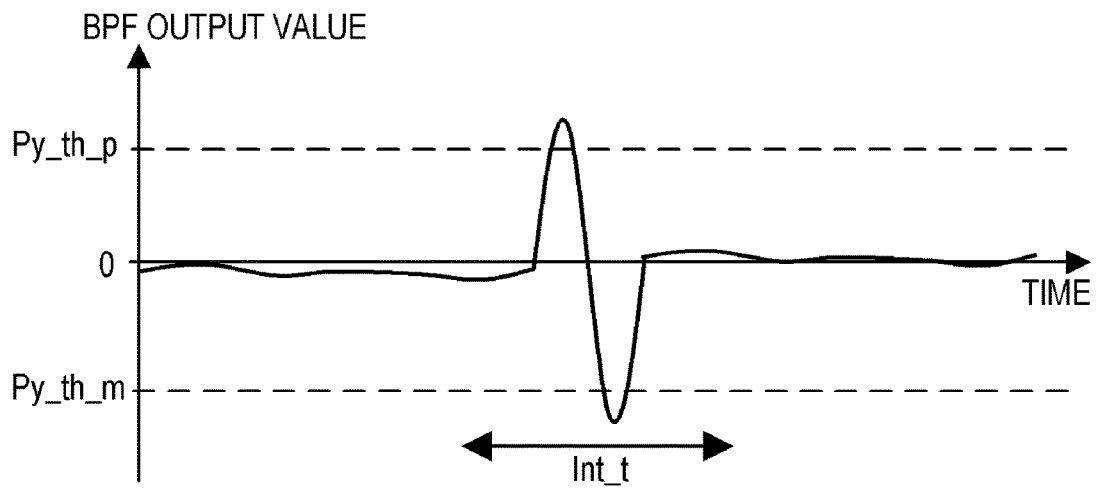

Further, when bandpass filtering is performed on the values illustrated in FIG. 12C in the time direction, output values (BPF output values) as illustrated in FIG. 12D are obtained. The CPU 128 determines whether or not a BPF output value is set to equal to or greater than a threshold value Py_th_p in a positive direction so as to be associated with the head motion and then set to equal to or less than a threshold value Py_th_m in a negative direction during a predetermined period of time Int_t. In a case where the user gazes at an operation icon fixed in the vicinity of the object in the rear space and performs a "nodding motion", the coordinates of the pupil center position in the vertical direction change in conjunction with the head motion. On the other hand, in a case where the user gazes at an operation icon fixed on the display surface and performs a "nodding motion", the coordinates of the pupil center position in the vertical direction do not change in association with the head motion or change less than in the case of the operation icon fixed in the vicinity of the object in the rear space. Thus, the CPU 128 can determine whether or not the operation icon gazed at by the user is an operation icon fixed in the vicinity of the object in the rear space by determining whether the pupil center position has not changed or has changed in association with the head motion so as to cancel out the head motion. In addition, the CPU 128 determines the operation icon gazed at by the user by also applying the same method to a "motion of shaking the head right and left" and a "motion of tilting the head".

Description will return to FIG. 11. In step S1103, it is determined whether or not the output value after the band-pass filtering in step S1102 satisfies a predetermined condition. The predetermined condition is satisfied, for example, when the output value is set to equal to or greater than a threshold value Py_th_p and then set to equal to or less than a threshold value Py_th_m during a predetermined period of time Int_t. In a case where the output value satisfies the predetermined condition, the CPU 128 proceeds to step S1104, and otherwise proceeds to step S1105.

In step S1104, the CPU 128 determines that the pupil center position has undergone a predetermined change (for example, a change associated with the "nodding motion").

In step S1105, the CPU 128 stores the pupil center position in the memory unit 129. After recording the pupil center position in the memory unit 129, the CPU 128 terminates the present flow.

Note that the CPU 128 determines whether or not the user is performing a head motion while gazing at a specific operation icon, and thus the CPU 128 determines whether or not the user is also gazing at the operation icon during the head motion. The head motion does not necessarily mean that the head rotates in one direction and then stops, and it is also assumed that the head returns in a direction opposite to the rotation direction of the head. In a case where such a head motion is performed in a state where the operation icon fixed to the object in the real space is displayed near the operation icon fixed on the display surface, there is a possibility that any operation icon will continue to exist in the vicinity of the line-of-sight position during the head motion. For this reason, it is not possible to more accurately determine an operation icon that the user desires to operate, only from the line-of-sight position and the head motion. In the present embodiment, the CPU 128 determines a change in pupil center position in addition to the line-of-sight position and the head motion. In this manner, it is possible to more accurately determine an operation icon that the user desires to operate.

Note that the CPU 128 does not determine whether or not the user is gazing at the operation icon during the head motion, but may rather determine whether or not the user is gazing before the head motion and determine whether or not there is a change in pupil center position associated with the head motion during the head motion.

In a case where a gaze position is estimated from a plurality of line-of-sight positions detected, a line-of-sight position used to estimate the gaze position may be selected based on a correlation between the movement of a line-of-sight and the movement of the head. For example, in a case where the line of sight moves so as to cancel out the movement of the head, a relatively new line-of-sight position is selected to estimate the gaze position. Thereby, it is possible to improve the responsiveness of the gaze position with respect to the actual eye movement. Further, in a case where the line of sight does not move so as to cancel out the movement of the head (the movement of the line of sight is relatively small), a large number of line-of-sight positions are selected to estimate the gaze position. Thereby, it is possible to stabilize the gaze position by reducing the influence of involuntary eye movement during fixation or the like on the gaze position.

Example of Processing Corresponding to Operation Icon

In the processing of steps S708 to S710 of FIG. 7, the CPU 128 determines whether or not the user has an intention of operating an operation icon, and performs processing of the HMD 100 corresponding to the operation icon. For example, in a case where the user has detected a predetermined head motion indicating the intention to operate the operation icon while gazing at a specific operation icon, the CPU 128 executes processing corresponding to the operation icon.

Figure 13A:
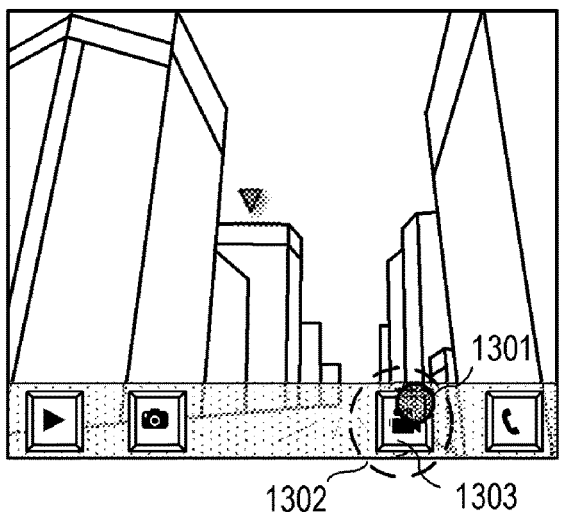
FIGS. 13A to 13E are diagrams illustrating an example of processing corresponding to an operation icon.

A specific example will be described. First, as illustrated in FIG. 13A, the user performs a "nodding motion" while a line-of-sight position 1301 calculated by a line-of-sight detection operation (step S704 in FIG. 7) remains within a predetermined range 1302 with respect to an operation icon 1303. The user looks at the vicinity of the operation icon 1303 and then performs a "nodding motion" to express the intention to execute processing corresponding to the operation icon 1303 in the vicinity of the line-of-sight position.

Figure 13B:
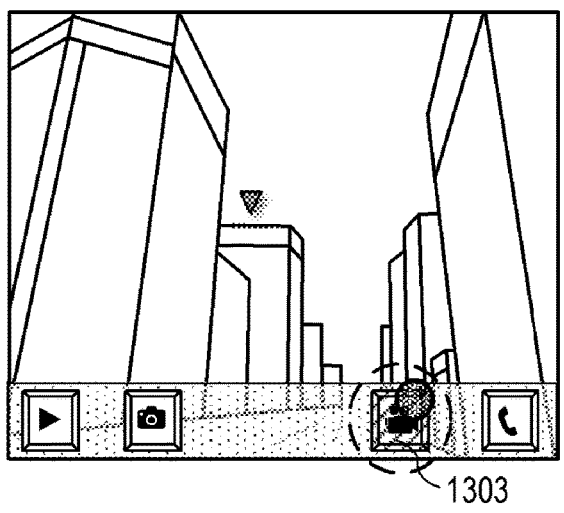

Next, as illustrated in FIG. 13B, the CPU 128 changes the color or brightness of the operation icon 1303 to inform the user that the operation icon 1303 has been selected to execute an operation, and then executes the processing corresponding to the operation icon 1303. In this manner, the CPU 128 performs control so that an operation icon of which processing is being executed and an operation icon of which processing is not being executed differ in the color or brightness. Note that the CPU 128 may perform control so that the color or brightness of the same operation icon is different between in a case where processing of the operation icon is being executed and in a case where processing of the operation icon is not being executed.

Figure 13C:
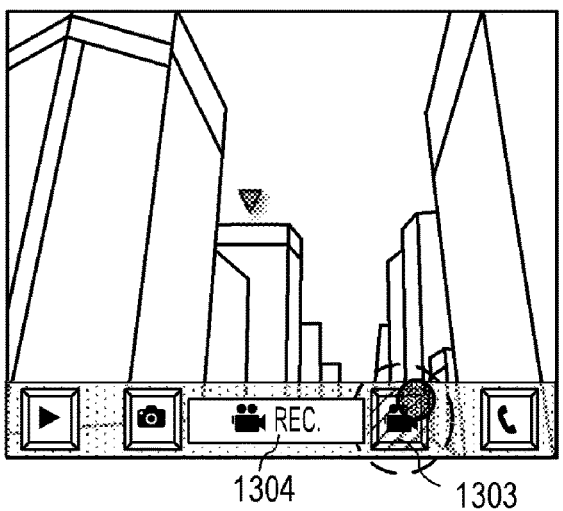

Next, as illustrated in FIG. 13C, the CPU 128 displays an icon 1304 indicating that the processing corresponding to the operation icon 1303 is being executed. In the example of FIG. 13C, the icon 1304 displays "recording" to indicate that recording is being executed as the processing corresponding to the operation icon 1303. Here, the CPU 128 may prepare for processing corresponding to an operation icon in response to a first determination indicating that the user has an intention of operating an operation icon in the vicinity of the line-of-sight position, and may execute the processing corresponding to the operation icon in response to a second determination. Thereby, it is possible to prevent an erroneous operation of the processing.

Figure 13D:
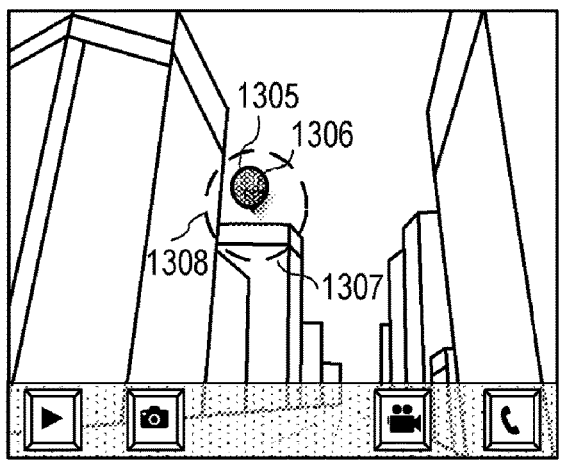
Figure 13E:
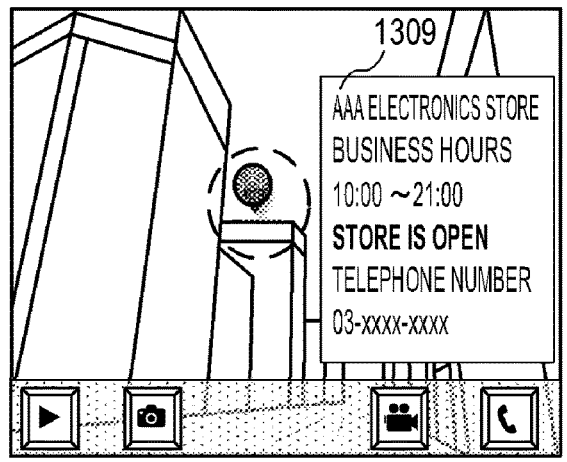

Another example of processing corresponding to an operation icon will be described. As illustrated in FIG. 13D, the user performs a "nodding motion" while a line-of-sight position 1305 remains within a predetermined range 1308 with respect to an operation icon 1306 associated with an object 1307. As illustrated in FIG. 13E, the CPU 128 displays an information display 1309 for the object 1307. In the example of FIG. 13E, the CPU 128 displays store information such as a store name, business hours, whether the store is open or not, and a telephone number of the object 1307.

For example, when the user performs a "motion of shaking the head right and left" in the same manner, the CPU 128 may return the selected operation icon to a non-selection state or may stop the processing being operated. When the user performs a "motion of tilting the head", the CPU 128 may perform processing such as switching to another operation icon or displaying an explanation of the operation icon.

Note that, although an operation icon that the user intends to operate is determined using changes in pupil center position in the present embodiment, the present invention is not limited to the pupil center position, and an operation icon that the user intends to operate may be determined using information equivalent to a pupil position. An operation icon that the user intends to operate may be determined using a line-of-sight position of the user instead of the pupil center position. Further, the CPU 128 may display an operation icon of which the position is fixed on the display surface and an operation icon disposed in a three-dimensional space at different distances. By displaying the operation icons at different distances, the CPU 128 may estimate a distance at which the user is gazing at an operation icon by using convergence angle information and may determine an operation icon that the user is gazing at.

Further, in the present embodiment, the CPU 128 acquires both an output value of the inertial sensor 110 and an output value of the image determination unit 112. In a case where any one of the output values satisfies a predetermined condition, the CPU 128 determines that a head motion has become a predetermined motion. Note that, in a case where both the output value of the inertial sensor 110 and the output value of the image determination unit 112 satisfy the predetermined condition, the CPU 128 may determine that a head motion has become a predetermined motion. In addition, an output value of any one of the CPU 128, the inertial sensor 110, and the image determination unit 112 may be acquired to determine whether or not a head motion has become a predetermined motion.

In this manner, according to the present embodiment, the user can easily operate the HMD in a hands-free manner.

Note that the above-described embodiment (including modification examples) is merely an example, and configurations obtained by appropriately modifying or changing the above-described configurations within the scope of the present invention are also included in the present invention. For example, although an example in which the present invention is applied to a display device has been described, the present invention can be applied to various electronic devices that control display devices. For example, the present invention can be applied to a controller, a personal computer (PC), and the like which are separate from a display device.

According to the present invention, it is possible to perform a simple and accurate GUI operation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-018221, filed on Feb. 8, 2022, which is hereby incorporated by reference herein in its entirety.

What is claimed is:

1. An electronic device comprising at least one memory and at least one processor which function as:
   a control unit configured to perform control to display a GUI on a display surface of a display device that is able to be attached to and detached from a head of a user;
   a gaze detection unit configured to detect a gaze position of the user based on an image acquired by capturing an eye of the user;
   a pupil detection unit configured to detect a pupil position of the user from the image of the eye;
   a motion detection unit configured to detect a motion of the head or a neck of the user;
   a determination unit configured to determine whether or not the user has an intention of operating a GUI in vicinity of the gaze position, based on the gaze position detected by the gaze detection unit, the motion detected by the motion detection unit, and a change in the pupil position during the motion; and
   an execution unit configured to execute processing corresponding to the GUI in the vicinity of the gaze position in a case where the determination unit determines that the user has the intention of operating the GUI.

2. The electronic device according to claim 1, further comprising:
   a gyro sensor,
   wherein the motion detection unit detects the motion based on an output result of the gyro sensor.

3. The electronic device according to claim 1, wherein the user is able to see a range corresponding to an orientation of the head in a three-dimensional space together with the GUI displayed on the display surface,
   the at least one memory and the at least one processor further function as an acquisition unit configured to acquire an image in the range corresponding to the orientation of the head in the three-dimensional space, and
   the motion detection unit detects the motion based on a change in the image acquired by the acquisition unit.

4. The electronic device according to claim 1, wherein the user is able to see a range corresponding to an orientation of the head in a three-dimensional space together with the GUI displayed on the display surface, and
   the GUI is a first GUI of which a position on the display surface is fixed, or a second GUI which is disposed in the three-dimensional space and of which a position on the display surface changes depending on a change in the orientation of the head.

5. The electronic device according to claim 4, wherein the gaze position is detected within a predetermined range from the first GUI and the second GUI by the gaze detection unit, and in a case where a predetermined motion indicating the intention of operating the GUI is detected by the motion detection unit, the determination unit determines that the user has an intention of operating the first GUI in the vicinity of the gaze position if a change in the pupil position during the predetermined motion is smaller than a predetermined threshold, and determines that the user has an intention of operating the second GUI in the vicinity of the gaze position if a change in the pupil position during the predetermined motion is larger than the predetermined threshold.

6. The electronic device according to claim 1, wherein the control unit performs control so that a GUI of which processing is being executed and a GUI of which processing is not being executed differ in color or brightness.

7. The electronic device according to claim 1, wherein the executing unit prepares for processing corresponding to the GUI in the vicinity of the gaze position in response to a first determination indicating that the user has the intention of operating the GUI, and executes the processing corresponding to the GUI in response to a second determination indicating that the user has the intention of operating the GUI.

8. The electronic device according to claim 1, wherein the display device is an optical see-through display.

9. The electronic device according to claim 1, wherein the display device is a video see-through display.

10. The electronic device according to claim 1, wherein the pupil position is a pupil center position.

11. An electronic device comprising at least one memory and at least one processor which function as:
a control unit configured to perform control to display a GUI on a display surface of a display device that is able to be attached to and detached from a head of a user;
a gaze detection unit configured to detect a gaze position of the user based on an image acquired by capturing an eye of the user;
a motion detection unit configured to detect a motion of the head or a neck of the user;
a determination unit configured to determine whether or not the user has an intention of operating a GUI in vicinity of the gaze position, based on the gaze position detected by the gaze detection unit, the motion detected by the motion detection unit, and a change in the gaze position during the motion; and
an execution unit configured to execute processing corresponding to the GUI in the vicinity of the gaze position in a case where the determination unit determines that the user has the intention of operating the GUI.

12. An electronic device comprising at least one memory and at least one processor which function as:
a control unit configured to perform control to display a GUI on a display surface of a display device that is able to be attached to and detached from a head of a user; and
a selection unit configured to select the GUI displayed by the control unit,
wherein a GUI to be selected in a case where the user moves the head without moving eyes is different from a GUI to be selected in a case where the user moves the head and moves the eyes to cancel out the movement of the head.

13. A control method of an electronic device, comprising:
performing control to display a GUI on a display surface of a display device that is able to be attached to and detached from a head of a user;
detecting a gaze position of the user based on an image acquired by capturing an eye of the user;
detecting a pupil position of the user from the image of the eye;
detecting a motion of the head or a neck of the user;
determining whether or not the user has an intention of operating a GUI in vicinity of the gaze position, based on the detected gaze position, the detected motion, and a change in the pupil position during the motion; and
executing processing corresponding to the GUI in the vicinity of the gaze position in a case where it is determined that the user has the intention of operating the GUI.

14. A control method of an electronic device, comprising:
performing control to display a GUI on a display surface of a display device that is able to be attached to and detached from a head of a user;
detecting a gaze position of the user based on an image acquired by capturing an eye of the user;
detecting a motion of the head or a neck of the user;
determining whether or not the user has an intention of operating a GUI in vicinity of the gaze position, based on the detected gaze position, the detected motion, and a change in the gaze position during the motion; and
executing processing corresponding to the GUI in the vicinity of the gaze position in a case where it is determined that the user has the intention of operating the GUI.

15. A non-transitory computer readable medium that stores a program, wherein the program causes a computer to execute a control method of an electronic device, the control method comprising:
performing control to display a GUI on a display surface of a display device that is able to be attached to and detached from a head of a user;
detecting a gaze position of the user based on an image acquired by capturing an eye of the user;
detecting a pupil position of the user from the image of the eye;
detecting a motion of the head or a neck of the user;
determining whether or not the user has an intention of operating a GUI in vicinity of the gaze position, based on the detected gaze position, the detected motion, and a change in the pupil position during the motion; and
executing processing corresponding to the GUI in the vicinity of the gaze position in a case where it is determined that the user has the intention of operating the GUI.

16. A non-transitory computer readable medium that stores a program, wherein the program causes a computer to execute a control method of an electronic device, the control method comprising:
performing control to display a GUI on a display surface of a display device that is able to be attached to and detached from a head of a user;
detecting a gaze position of the user based on an image acquired by capturing an eye of the user;
detecting a motion of the head or a neck of the user;
determining whether or not the user has an intention of operating a GUI in vicinity of the gaze position, based on the detected gaze position, the detected motion, and a change in the gaze position during the motion; and
executing processing corresponding to the GUI in the vicinity of the gaze position in a case where it is determined that the user has the intention of operating the GUI.

* * * * *